United States Patent [19]

Suttrop

[11] Patent Number: 6,092,590
[45] Date of Patent: Jul. 25, 2000

[54] METHOD AND EVAPORATOR DEVICE FOR EVAPORATING A LOW TEMPERATURE LIQUID MEDIUM

[75] Inventor: Friedemann Suttrop, Aachen, Germany

[73] Assignee: DaimlerChrysler Aerospace Airbus GmbH, Hamburg, Germany

[21] Appl. No.: 08/851,593

[22] Filed: May 5, 1997

[30] Foreign Application Priority Data

May 3, 1996 [DE] Germany .......................... 196 17 916

[51] Int. Cl.[7] ....................................... F28D 7/10
[52] U.S. Cl. ......................... 165/156; 165/154; 165/169
[58] Field of Search .................. 165/155, 169, 165/154, 156

[56] References Cited

U.S. PATENT DOCUMENTS

| | | |
|---|---|---|
| 231,013 | 8/1880 | Crutchett . |
| 2,621,477 | 12/1952 | Powter et al. . |
| 2,730,337 | 1/1956 | Roswel .............................. 165/155 X |
| 3,151,673 | 10/1964 | Strache .................................. 165/155 |
| 3,181,590 | 5/1965 | Dupler . |
| 3,189,018 | 6/1965 | Sass et al. ........................ 165/155 X |
| 3,237,400 | 3/1966 | Kuhrt . |
| 3,504,994 | 4/1970 | Desty et al. . |
| 3,617,224 | 11/1971 | Brun-Tsekhovoi . |
| 3,859,040 | 1/1975 | Shefsiek et al. .................... 165/154 X |
| 3,870,459 | 3/1975 | Desty et al. . |
| 3,907,028 | 9/1975 | Lawson .................................. 165/156 |
| 4,047,490 | 9/1977 | Galluzzo ........................... 165/155 X |
| 4,100,733 | 7/1978 | Striebel et al. . |
| 4,113,009 | 9/1978 | Meyer et al. ....................... 165/154 X |
| 5,215,144 | 6/1993 | May et al. .............................. 165/154 |

FOREIGN PATENT DOCUMENTS

| | | |
|---|---|---|
| 1104211 | 11/1955 | France . |
| 259387 | 10/1988 | Japan ...................................... 165/154 |
| 7802258 | 9/1979 | Netherlands ............................ 165/156 |
| 1246126 | 9/1971 | United Kingdom . |

OTHER PUBLICATIONS

John B. Heywood et al. Parameters Controlling Nitric Oxide Emissions From Gas Turbine Combustors, Agard–CP–125, Neuilly sur Seine, France, Apr. 1973, pp. 21–1 to 21–16.

Ziemann et al. LOW–$NO_x$ Combustors For Hydrogen Fueled Aero Engine, World Hydrogen Energy Conference, Stuttgart, Germany, Jun. 1996.

V.A. Sosounov et al. Experimental Turbofan Using Liquid Hydrogen and Liquid Natural Gas as Fuel, Joint Propulsion Conference, Orlando, FL. USA, Jul. 1990, pp. 1 to 11.

Primary Examiner—Leonard Leo
Attorney, Agent, or Firm—W. F. Fasse; W. G. Fasse

[57] ABSTRACT

In a method and evaporator device for evaporating a low temperature liquid medium, such as hydrogen for example, the hydrogen is first evaporated and at least partially superheated in a forward-flowing first channel, and is then directed to flow back in the opposite direction in a second return-flowing channel. The second channel is especially interposed between the first channel and a passage through which flows a heat-providing medium such as a hot exhaust gas. Thus, the superheated hydrogen flowing in the second channel serves as an intermediate layer for heat transfer from the heat-providing medium through the hydrogen in the second channel to the low temperature, initially liquid hydrogen in the first channel. The heat exchange surfaces in contact with the heat-providing medium are not directly adjacent the extremely cold surfaces in contact with the in-flowing low temperature liquid hydrogen, and the superheated hydrogen acts as a buffer between the hot side and the cold side of the evaporator. As a result, the evaporator has a very low structural weight, and condensation and icing problems can be avoided even when using a hot medium and a cold medium having extremely different temperatures.

17 Claims, 1 Drawing Sheet

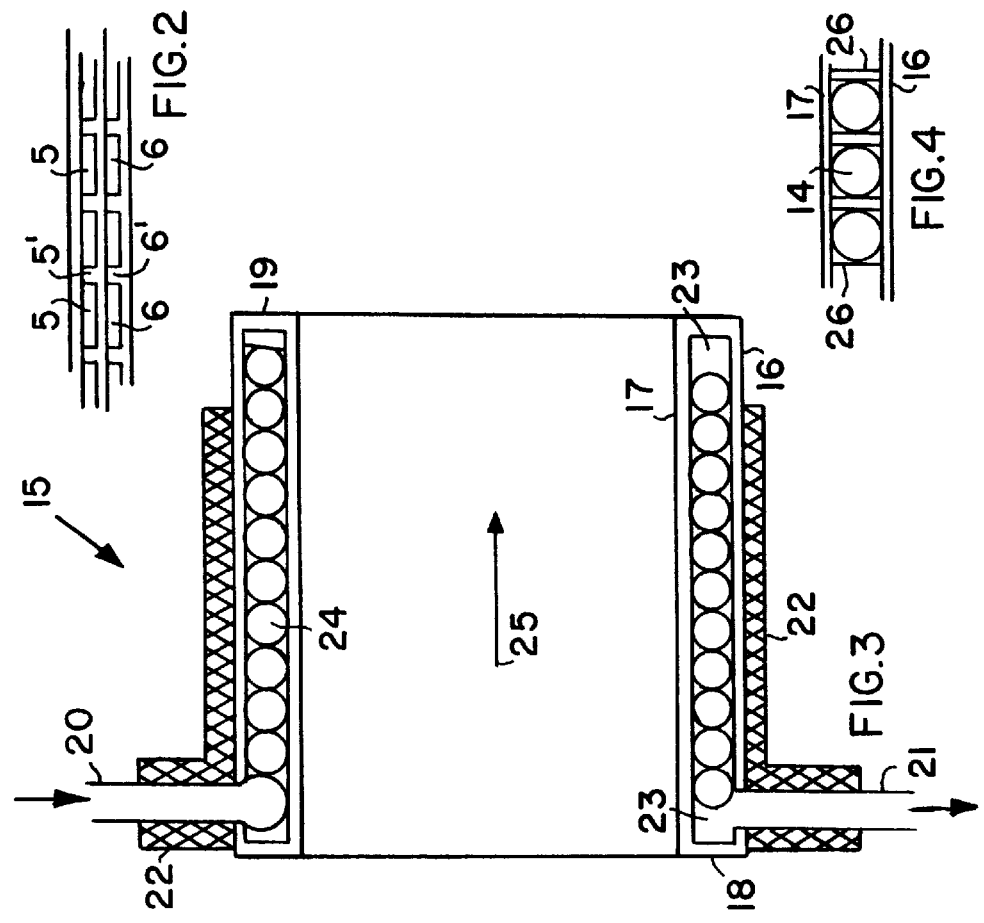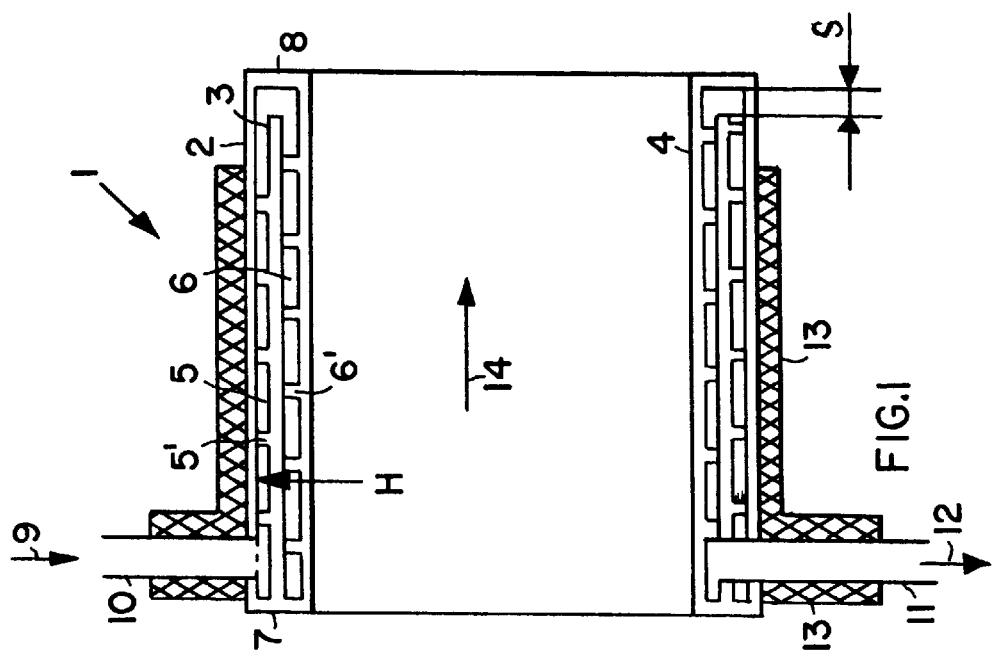

METHOD AND EVAPORATOR DEVICE FOR EVAPORATING A LOW TEMPERATURE LIQUID MEDIUM

FIELD OF THE INVENTION

The invention relates to a method and an evaporator device for evaporating a low temperature liquid medium such as hydrogen, using an evaporator operating as a heat exchanger between a hot medium that gives off its heat and the liquid medium that is to be evaporated.

BACKGROUND INFORMATION

Evaporators of the above mentioned general type are typically embodied as plate-type or tubular heat exchangers. Such heat exchangers are typically used in applications in which a medium is stored in liquid form at a low or super-cold temperature in a storage tank, but is to be provided for use in a gaseous physical phase. An example of such an application is the use of cryogenic liquids, such as liquid hydrogen or liquid natural gas, as a fuel or energy carrying medium for aircraft propulsion engines, and especially turbine engines.

A particular feature relating to such evaporator devices is that the liquid medium to be evaporated is delivered to the evaporator with a very low inlet temperature of only about 20 K (−253° C.). On the other hand, a relatively hot medium, such as the surrounding atmospheric air, or the exhaust gas of an engine for example, or some other heated medium, is provided to the evaporator as a heat source for evaporating and in some cases superheating the cryogenic liquid medium. Thus, the hot medium comes into contact with extremely cold surfaces of the evaporator, which are cooled by the cryogenic medium that is to be evaporated. As a result there is a danger that the hot medium will be cooled to below its respective dew point temperature or freezing point temperature so that it at least partially condenses or forms ice on the surfaces of the evaporator. Such condensation or ice build-up obstructs the flow passages for the hot medium, interferes with the operation of the evaporator, and can present a serious danger, especially if the evaporator is part of a fuel preparation system for an aircraft engine.

Typically, this danger of freezing or condensing of the hot medium is avoided or counter-acted by reducing the heat transfer between the hot medium and the cryogenic medium that is to be evaporated. In this manner, higher surface temperatures can be achieved at the heat inlet side of the evaporator. However, this in turn necessitates a larger and heavier structure of such an evaporator in order to achieve the same total or overall heat transfer and evaporation of the cryogenic medium, which is especially undesirable in the application of such evaporators in aircraft and spacecraft.

OBJECTS OF THE INVENTION

In view of the above it is the aim of the invention achieve the following objects singly or in combination:
  to provide a method and an evaporator device for evaporating a low temperature liquid medium in such a manner so as to reliably avoid the condensation or ice formation of the hot medium such as air or exhaust gases that are provided to the evaporator;
  to provide such an evaporator device with a particularly compact and lightweight structure while still achieving an efficient heat transfer and avoiding the formation of condensate or ice; and
  to provide a construction of an evaporator device that can conveniently be incorporated or integrated into a hot gas duct or even a combustion chamber of an engine such as a turbine engine.

SUMMARY OF THE INVENTION

The above objects have been achieved in a method of evaporating a liquid medium such as hydrogen in an evaporator operating as a heat exchanger, according to the invention, wherein the hydrogen first flows through a first portion of a flow channel where it is evaporated and superheated to a certain extent, and then flows back through a second portion of the flow channel where it is further heated. The hydrogen in the second channel portion also acts as an intermediary or buffer for heat transfer from the hot medium through the hydrogen in the second channel portion and to the hydrogen in the first channel portion. The net direction of flow of the hydrogen in the second channel portion is substantially opposite the direction of flow of the hydrogen in the first channel portion.

The above objects are further achieved in the evaporator device according to the invention, having a flow channel for the medium to be evaporated and a passage for the heat-providing medium. The channel is arranged outwardly around the passage and comprises an initial or first portion and a second portion with a return flow in the opposite direction from that of the first portion. To achieve this, the second channel portion is connected in series flow communication with a downstream end of the first channel portion. More particularly, the first portion and the second portion of the flow channel for the medium to be evaporated are substantially cylindrical channels arranged concentrically outside of and around the passage through which the heat-providing medium flows.

Preferably, at least a part of the second return-flow portion of the first channel is arranged radially inwardly from the first initial portion of the channel, so that the second return flow portion is between the first portion of the channel and the hot medium passage. The hot medium passage and the second channel portion thus share a common boundary wall therebetween, i.e. the hot medium is on one side of this common boundary wall while the colder medium is on the other side of this common boundary wall. Similarly, the first and second channel portions share an internal boundary wall therebetween, while the first channel portion is further bounded by an outer boundary wall opposite the internal boundary wall, whereby this outer boundary wall may form the outer wall of the overall apparatus. The hot medium does not flow anywhere directly along the outer boundary wall. In this manner, the surfaces of the evaporator adjacent or bounding the hot medium passage are not directly exposed to the extreme low temperature liquid medium entering the evaporator at the inlet thereof, but instead are only exposed to the medium in the return flow channel portion where the medium has already been evaporated and partially super-heated.

According to further details of the invention, the first forward flow portion and the second return flow portion of the channel for the medium to be evaporated can have a spiral or helical flow channel shape, wherein the spiral rotation direction can be the same or different in the two flow channel portions. In a further embodiment, at least either the forward flowing channel portion or the return flowing channel portion can comprise a helical or spiral coiled tube arranged within a cylindrical space. In such an embodiment, the net flow direction of the medium refers to a substantially axial direction to the right or to the left, while the incremental or local flow direction at any point in the helical flow channels includes a substantial circular or circumferential component.

BRIEF DESCRIPTION OF THE DRAWINGS

In order that the invention may be clearly understood, it will now be described, by way of example, with reference to the accompanying drawings, wherein:

FIG. 1 is a lengthwise sectional view through an evaporator device according to a first embodiment of the invention;

FIG. 2 is a detail sectional view showing a portion of an evaporator generally according to FIG. 1 with a variation of the first embodiment;

FIG. 3 is a lengthwise sectional view through an evaporator device using a helical tube as a flow channel according to a second embodiment of the invention; and FIG. 4 is a detail sectional view showing a portion of an evaporator device generally according to FIG. 3, but with a variation of the second embodiment.

DETAILED DESCRIPTION OF PREFERRED EXAMPLE EMBODIMENTS AND OF THE BEST MODE OF THE INVENTION

FIG. 1 shows one possible embodiment of an evaporator 1 according to the invention, which may be used for evaporating hydrogen as a fuel for an aircraft propulsion turbine engine, for example. The evaporator 1 principally comprises three concentrically arranged pipes 2, 3, and 4, wherein a respective helical groove or channel 5 and 6 is provided on the outer surfaces of the two radially inner pipes 3 and 4. Each of the grooves 5 and 6 may be a single continuous helical groove, or may comprise a respective plurality of parallel helical grooves. For example, two separate, interleaved grooves 5 may be provided in the pipe 3.

The grooves or channels 5 and 6 may be formed in various ways. For example, the grooves 5 and 6 may be milled or otherwise machined into the outer circumferential surfaces of the pipes 3 and 4 while leaving radially extending helical ribs or walls 5' and 6' between adjacent portions of the grooves. Alternatively, the grooves or channels 5 and 6 may be machined or provided on the inner surfaces of the pipes 2 and 3, but the required machining operations are simpler in the preferred arrangement described above. As a further alternative to machining, separate ribs or webs 5' and 6' may be mounted, e.g. by welding, on the pipes 3 and 4 to form the grooves or channels 5 and 6 therebetween. The ribs or webs 5' and 6' forming the walls of the channels are further preferably connected to the respective inner surfaces of the adjacent radially outer pipes.

The outer pipe 2 and the inner pipe 4 are respectively joined and sealed together in a gas-tight manner by two end walls 7 and 8. The middle pipe 3 is also joined to the end wall 7 in a gas-tight manner, but a gap S is left to remain between the right-hand end of the middle pipe 3 (as shown in FIG. 1) and the end wall 8. This gap S provides a flow communication passage or flow port from the first channel portion 5 to the second channel portion 6 to form a continuous flow channel.

The evaporator 1 further includes an inlet 10 communicating with an upstream end of the first channel portion 5, such that a liquid medium to be evaporated, such as hydrogen, can be introduced in the direction of arrow 9 through the inlet 10 and into the first channel portion 5. Once the medium such as hydrogen has flowed through the first channel portion 5 and the second channel portion 6, the resulting gas exits from the evaporator 1 in the direction of arrow 12 through the outlet 11 provided in communication with a downstream end of the second channel portion 6. A layer of any known insulation material 13 is arranged on the outer surfaces of the evaporator 1 that are exposed to the very cold temperatures of the medium to be evaporated, in order to avoid condensation or icing on these surfaces. A heat-providing medium flows in the direction of arrow 14 through a hot gas passage provided by the inner pipe 4, during operation of the evaporator 1.

With the above arrangement, the medium that is to be evaporated flows through the inlet 10 and then into and through the first channel portion 5 in a direction progressing from left to right in FIG. 1. The medium then flows through the gap S into the second channel portion 6, through which the medium then flows in a reverse direction progressing from right to left in FIG. 1 to finally exit from the outlet 11. Thus, the medium to be evaporated first flows through a forward-flowing channel portion 5, and then flows back in the opposite direction through a return-flowing channel portion 6.

As the medium flows through the first channel portion 5 and the second channel portion 6, it is heated and thus evaporated and superheated by thermal energy provided by the hot medium flowing in the direction of arrow 14 in the hot gas passage formed by the pipe 4. As represented by arrow H, the heat is transferred from the hot gas, radially outwardly first to the medium in the second channel portion 6, which has already been evaporated and partially superheated, and then to the colder medium in the first channel portion 5. Thus, the first channel portion 5 provides a pre-heating and pre-evaporating channel, while the second channel portion 6 forms a super-heating and heat transfer intermediary or buffer channel. With this arrangement, the outer surface of the pipe 4 is only in contact with gaseous medium in the second channel portion 6 that has already been evaporated and partially superheated, and is not directly in contact with the extremely cold liquid medium entering the inlet 10 and flowing in the first channel portion 5. The medium in the second channel portion 6 forms a buffer or intermediate layer between the hot gas flowing along arrow 14, and the extremely cold liquid medium flowing in the inlet 10 and the first channel portion 5. In this manner, condensation and icing of the hot gas flowing along the inner surface of the inner pipe 4 is avoided.

In the first embodiment of FIG. 1, the first channel portion 5 and the second channel portion 6 may have either the same or oppositely directed helical rotations. In other words, both the first channel portion 5 and the second channel portion 6 may have a clockwise rotation or a counterclockwise rotation, or one channel portion may have a clockwise rotation while the other channel portion has a counterclockwise rotation. On the other hand, the variation in FIG. 2 is only possible when both helical channel portions 5 and 6 have the same direction of rotation. In the variation according to FIG. 2, the walls 5' and 6' of the channel portions 5 and 6 are arranged in radial registration or alignment with one another. Such an arrangement achieves a particular high strength and rigidity of the evaporator 1, with a lightweight construction. Both the outer wall formed by the outer pipe 2 and the inner wall formed by the inner pipe 4 are well supported against deformation. However, this arrangement provides a more-direct thermal conduction path between the hot side and the cold side of the evaporator, which may be undesirable due to the above discussed condensation and icing problems in particular situations.

FIG. 3 shows a second embodiment of the invention in the form of an evaporator 15 including an outer shell or casing 16, an inner shell or casing 17, two end walls 18 and 19, an inlet 20, an outlet 21, and an insulating layer 22. The outer casing 16 and the inner casing 17, together with the end walls 18 and 19, enclose a gas-tight hollow space 23 substantially in the form of an annular space. In this evaporator 15, similarly to the above described evaporator 1, the flow path for the medium to be evaporated includes a first channel portion through which the medium will flow in a forward direction, and a second channel portion through which the medium will flow in a return direction.

In order to achieve this, a helical or spiral tube 24 is arranged in the hollow space 23 in such a manner so that the spiral tube 24 uniformly contacts the outer casing 16 and the inner casing 17. Thus, the first channel portion is formed within the spiral tube 24, and the second channel portion is formed in the space 23 outside of the spiral tube 24. The left end of the spiral tube 24 as shown in FIG. 3 is connected only to the inlet 20, while the right end of the spiral tube 24 is open so as to communicate with the hollow space 23. Thus, if the medium to be evaporated is directed into the inlet 20, it then flows through the helical tube 24 from the left to the right as shown in FIG. 3, and then exits from the helical tube 24 into the hollow space 23. From here, the medium flows in the reverse direction, namely from the right to the left, through the channel spaces formed between the tube 24 and the outer casing 16 and the inner casing 17 respectively, to ultimately flow out of the outlet 21. The channel spaces remaining within the hollow space 23 have a substantial gusset wedge or hour-glass cross-section, depending upon how tightly together the spiral coils of the tube 24 are arranged, i. e. depending on whether or not the adjacent coils of the spiral tube 24 contact one another. A spiral tube may alternatively or additionally be arranged to form the second return-flowing channel portion in a similar manner.

A hot medium flows in the direction of arrow 25 through a hot gas passage provided by the inner casing 17, and transfers heat to the medium to be evaporated within the spiral tube 24 and the annular space 23. As a result, the medium exits from the outlet 21 in a gaseous physical state. The already-heated medium in the spaces 23 forms a buffer between the hot casing 17 and the cold liquid medium in the spiral tube 24, and especially near the inlet end thereof.

FIG. 4 shows a further variation of the embodiment of an evaporator shown in FIG. 3. In this variation, a spiral metal web or rib 26 is wrapped around the outer surface of the inner casing 17, and connected thereto, for example by welding. Thus, a web or rib 26 is provided between each adjacent pair of coils of the spiral tube 24. This arrangement is effective to strengthen and stiffen the inner casing 17 of the evaporator in situations in which a high internal pressure is expected within the evaporator. In this manner, denting or bending of the inner casing 17 can be avoided. Furthermore, this arrangement can especially provide a plurality of parallel-connected flow channels making up the second channel portion. However, the webs 26 provide a path of thermal conduction between the hot casing 16 and the cold spiral tube 24, which may be undesirable in some situations.

A method according to the invention can be carried out using any one of the evaporators shown in FIGS. 1 to 4, or other variants.

According to the method, the medium, which may be hydrogen for example, is first evaporated and at least partially superheated while it flows through a first forward-flowing channel portion, and is then directed to flow back through a return-flowing channel portion along the surface of the forward-flowing channel portion. In the second channel portion, the medium is used as an intermediary layer for the heat transfer from the heat-providing medium to the medium that is to be evaporated in the first channel portion. In the second channel portion, the medium is further heated by heat being transferred from the heat-providing medium, but is also cooled by further transfer of the heat to the medium in the first channel portion. By appropriately dimensioning and configuring the evaporator, a re-condensing of the medium in the second channel portion can be avoided, especially since the superheated medium within the second channel portion will only re-condense if it is again cooled down to its low dew point temperature of about 20 K.

The method and evaporator described herein, using a two-stage reversing flow evaporation, achieves advantages especially when a hot medium and a cold medium of extremely different temperatures are to be handled, since icing and condensation can be avoided. Furthermore, the invention simultaneously achieves an extremely low structural weight.

In a practical application, the inner pipe or casing 4, 17 is a component of a hot gas duct of a turbine engine or the like. Alternatively, the present method and evaporator can also successfully be used if the pipe 4 or inner casing 17 or other heat-providing element is incorporated into a combustion chamber of a combustion engine, such as a gas turbine engine.

Although the invention has been described with reference to specific example embodiments, it will be appreciated that it is intended to cover all modifications and equivalents within the scope of the appended claims. The present disclosure also covers all possible combinations of any of the various features recited in the several claims.

What is claimed is:

1. An evaporator apparatus for evaporating a first medium that is initially in liquid form, through heat transfer from a second medium, comprising:

a hot medium passage adapted to have the second medium flow therethrough, and a channel adapted to have the first medium flow therethrough and be evaporated therein; wherein:

said channel is arranged outwardly around said hot medium passage;

said channel includes a first forward-flowing channel portion adapted to have the first medium flow therein in a first net direction, and a second return-flowing channel portion connected in series flow communication at a downstream end of said first channel portion and adapted to have the first medium flow therein in a second net direction substantially opposite said first net direction;

at least a part of said second channel portion is arranged between the entirety of said hot medium passage and the entirety of said first channel portion;

said hot medium passage, said first channel portion and said second channel portion are so arranged relative to each other so that said hot medium passage and said second channel portion share a common boundary wall therebetween, and so that said hot medium passage and said first channel portion do not share a common boundary wall anywhere in said evaporator apparatus; and said first channel portion comprises a first helical flow channel, said second channel portion comprises a second helical flow channel, and said first and second helical flow channels respectively have helical rotations in opposite rotation directions.

2. The evaporator apparatus in accordance with claim 1, further comprising an inlet for said first medium arranged at and connected for flow communication to an upstream end of said first channel portion, an outlet for said first medium arranged at and connected for flow communication from a downstream end of said second channel portion, and a flow port provided at said downstream end of said first channel portion and arranged for flow communication to an upstream end of said second channel portion, wherein said upstream end of said first channel portion is adjacent said downstream end of said second channel portion, and said downstream end of said first channel portion is adjacent said upstream end of said second channel portion.

3. The evaporator apparatus in accordance with claim 1, wherein said channel is arranged concentrically and radially outwardly around said hot medium passage, and wherein said at least a part of said second channel portion is arranged radially between said hot medium passage and said first channel portion.

4. The evaporator apparatus in accordance with claim 3, wherein all of said second channel portion is arranged radially between said hot medium passage and said first channel portion.

5. The evaporator apparatus in accordance with claim 1, wherein said hot medium passage and said channel respectively comprise and are bounded by concentrically arranged cylindrical walls, wherein at least one of said walls has grooves milled therein with radially extending webs remaining between adjacent portions of said grooves, wherein said webs are integral and unitary with said at least one of said walls, so as to form at least one of said first channel portion and said second channel portion in said milled grooves.

6. The evaporator apparatus in accordance with claim 1, wherein said second channel portion comprises a plurality of flow channels connected and extending in parallel with one anther.

7. The evaporator apparatus in accordance with claim 1, wherein said hot medium passage is a combustion chamber.

8. A method of using the evaporator apparatus according to claim 1 for evaporating a first medium that is initially in liquid form, said method comprising the following steps:

(a) introducing said first medium in liquid form into said first channel portion, and flowing said first medium in a first net direction in said first channel portion, so as to evaporate and at least partially superheat said first medium;

(b) after said step (a), flowing said first medium in a second net direction substantially opposite said first net direction in said second channel portion; and (c) flowing said second medium in said hot medium passage; wherein heat is transferred from said second medium into said first medium in said second channel portion, and heat is transferred from said first medium in said second channel portion into said first medium in said first channel portion, without transferring any heat directly from said second medium into said first medium in said first channel portion.

9. The method according to claim 8, wherein said step (b) comprises flowing said first medium in said second channel portion so as to be physically between all of said first medium in said first channel portion and all of said hot medium, and so as to flow along a hotter surface directly adjacent said hot medium passage and a colder surface directly adjacent said first channel portion.

10. The method according to claim 8, wherein said first medium in said second channel portion forms an intermediate heat transfer buffer between said hot medium and said first medium in said first channel portion.

11. The method according to claim 8, wherein said first medium is hydrogen that is initially in cryogenic liquid form when it is introduced into said first channel portion.

12. The method according to claim 8, wherein said hot medium is a combustion exhaust gas from a combustion engine.

13. The evaporator apparatus in accordance with claim 1, wherein said first channel portion includes a radially outer boundary wall that forms an outer wall of said apparatus and that does not bound any portion of said hot medium passage.

14. The evaporator apparatus in accordance with claim 13, further comprising a thermal insulation layer arranged radially outwardly around said radially outer boundary wall.

15. The evaporator apparatus in accordance with claim 1, wherein said first channel portion and said second channel portion share an internal boundary wall therebetween, wherein said first channel portion further includes an outer boundary wall opposite said internal boundary wall, and wherein said first channel portion and said second channel portion are so arranged relative to each other so that a heat transfer occurs from the second medium in said hot medium passage to the first medium in said second channel portion through said common boundary wall, and a heat transfer occurs from the first medium in the second channel portion to the first medium in the first channel portion through said internal boundary wall, and no heat transfer occurs directly from the second medium to the first medium in said first channel portion through said outer boundary wall.

16. The evaporator apparatus in accordance with claim 1, wherein said hot medium passage in its entirety is a straight cylindrical passage extending from an inlet into said apparatus at one end of said apparatus to an outlet from said apparatus at another end of said apparatus, and said hot medium passage and said channel are so arranged that the second medium is always constrained to be radially inwardly located relative to said channel.

17. A combination comprising said evaporator apparatus according to claim 1, said second medium which comprises a combustion gas, and said first medium which comprises a cryogenic liquid when it is introduced into said first channel portion.

* * * * *